United States Patent
Lee et al.

(10) Patent No.: US 11,161,140 B2
(45) Date of Patent: Nov. 2, 2021

(54) SLOT DIE COATER FOR CHANGING COATING FORM OF ELECTRODE ACTIVE MATERIAL SLURRY THROUGH MOVEMENT OF SLOTS

(71) Applicant: LG Chem, Ltd., Seoul (KR)

(72) Inventors: Do-Hyun Lee, Daejeon (KR);
Taek-Soo Lee, Daejeon (KR);
Cheol-Woo Kim, Daejeon (KR);
Sang-Hoon Choy, Daejeon (KR)

(73) Assignee: LG Chem, Ltd.

( * ) Notice: Subject to any disclaimer, the term of this patent is extended or adjusted under 35 U.S.C. 154(b) by 42 days.

(21) Appl. No.: 16/473,114

(22) PCT Filed: Jun. 29, 2018

(86) PCT No.: PCT/KR2018/007422
§ 371 (c)(1),
(2) Date: Jun. 24, 2019

(87) PCT Pub. No.: WO2019/035553
PCT Pub. Date: Feb. 21, 2019

(65) Prior Publication Data
US 2019/0351446 A1 Nov. 21, 2019

(30) Foreign Application Priority Data

Aug. 17, 2017 (KR) .................. 10-2017-0104380
Jun. 28, 2018 (KR) .................. 10-2018-0074840

(51) Int. Cl.
*B05C 5/02* (2006.01)
*B05B 1/04* (2006.01)
*H01M 4/04* (2006.01)

(52) U.S. Cl.
CPC ............. *B05C 5/0262* (2013.01); *B05B 1/04* (2013.01); *B05B 1/044* (2013.01); *B05C 5/0283* (2013.01); *H01M 4/0404* (2013.01)

(58) Field of Classification Search
CPC ... B05C 5/0262; B05C 5/0254; B05C 5/0283; H01M 4/0404; H01M 4/04;
(Continued)

(56) References Cited

U.S. PATENT DOCUMENTS 3,694,119 A * 9/1972 Scheibling ............ B29C 48/307
425/133.5
5,922,408 A   7/1999 Nakama et al.
(Continued)

FOREIGN PATENT DOCUMENTS

CN          1757441 A    4/2006
CN        102259076 A   11/2011
(Continued)

OTHER PUBLICATIONS

International Search Report from PCT/KR2018/007422 dated Oct. 19, 2018, 2 pages.
(Continued)

*Primary Examiner* — Laura Edwards
(74) *Attorney, Agent, or Firm* — Lerner, David, Littenberg, Krumholz & Mentlik, LLP

(57) ABSTRACT

Disclosed is a slot die coater for coating an electrode active material slurry on an electrode current collector, which includes a lower die having a lower outlet, and an upper die disposed above the lower die and having an upper outlet, wherein an upper surface of the lower die and a lower surface of the upper die are at least partially in contact with each other and capable of sliding relative to one another such that the upper die and the lower die are capable of sliding relative to each other along a horizontal direction.

10 Claims, 8 Drawing Sheets

(58) Field of Classification Search
CPC ..... B29C 48/313; B29C 48/31; B29C 48/315; B29C 48/0013; B29C 48/0014; B05B 1/04; B05B 1/044; Y02E 60/10; B05D 7/52
USPC .................................................. 118/412, 419
See application file for complete search history.

(56) References Cited

U.S. PATENT DOCUMENTS

| | | | |
|---|---|---|---|
| 2002/0176945 A1* | 11/2002 | Hudson | B05C 5/0254 427/558 |
| 2011/0287171 A1 | 11/2011 | Seo et al. | |
| 2013/0101885 A1 | 4/2013 | Lee et al. | |
| 2015/0053133 A1 | 2/2015 | Park et al. | |

FOREIGN PATENT DOCUMENTS

| | | | |
|---|---|---|---|
| CN | 103181000 | A | 6/2013 |
| CN | 104487176 | A | 4/2015 |
| JP | H0838972 | A | 2/1996 |
| JP | H0838973 | A | 2/1996 |
| JP | H09276770 | A | 10/1997 |
| JP | 2000117175 | A | 4/2000 |
| JP | 2001345096 | A | 12/2001 |
| JP | 2003112101 | A | 4/2003 |
| JP | 2003275651 | A | 9/2003 |
| JP | 2012256544 | A | 12/2012 |
| JP | 2014229479 | A | 12/2014 |
| JP | 2015026471 | A | 2/2015 |
| KR | 200406129 | Y1 | 1/2006 |
| KR | 20110128589 | A | 11/2011 |

OTHER PUBLICATIONS

Search Report from Chinese Office Action for Application No. 2018800045850 dated Jul. 3, 2020; 2 pages.

* cited by examiner

SLOT DIE COATER FOR CHANGING COATING FORM OF ELECTRODE ACTIVE MATERIAL SLURRY THROUGH MOVEMENT OF SLOTS

CROSS-REFERENCE TO RELATED APPLICATIONS

The present application is a national phase entry under 35 U.S.C. § 371 of International Application No. PCT/KR2018/007422, filed on Jun. 29, 2018, which claims priority from Korean Patent Application No. 10-2017-0104380, filed on Aug. 17, 2017, and Korean Patent Application No. 10-2018-0074840, filed on Jun. 28, 2018, the disclosure of which are incorporated by reference herein.

TECHNICAL FIELD

The present disclosure relates to a slot die coater for changing a coating form of an electrode active material slurry by moving slots, and more particularly, to a slot die coater which includes a pair of lower die blocks forming a lower slot and a pair of upper die blocks forming an upper slot to simply adjust electrode active material slurry discharging locations of the lower slot and the upper slot by a relative movement of the lower die blocks and the upper die blocks.

BACKGROUND ART

As technology development and demand for mobile devices increase, the demand for secondary batteries as energy sources is rapidly increasing. The secondary batteries essentially include an electrode assembly, which is a power generation element.

The electrode assembly includes a positive electrode, a separator and a negative electrode, which are laminated at least once. The positive electrode and the negative electrode are formed by coating and drying a positive electrode active material slurry and a negative electrode active material slurry on electrode current collectors respectively made of an aluminum foil and a copper foil.

In order to make the charge and discharge characteristics of the secondary battery uniform, the positive electrode active material slurry and the negative electrode active material slurry should be uniformly coated on the current collectors. For this, a slot die coating process is generally performed.

FIG. 1 is a schematic diagram for illustrating the slot die coating process. Referring to FIG. 1, a coating device 10 includes a slot die coater 20 for discharging an electrode active material slurry and a coating roll 40, and coats a current collector 50 while rotating the coating roll 40.

The electrode active material slurry discharged from the slot die coater 20 is applied broadly on one surface of the current collector 50 to form an electrode active material layer.

In some cases, an electrode active material layer forming another layer may be additionally applied on one an electrode active material layer forming one layer so that the electrode active material layer has two layers. In order to form the two-layered electrode active material layer, a slot die coater 70 having three die blocks 71, 72, 73 is used as shown in FIG. 2. The slot die coater 70 may continuously apply an additional electrode active material slurry on a previously applied electrode active material slurry by simultaneously discharging the electrode active material slurries through two outlets 74, 75 formed between neighboring die blocks.

However, since the process using the slot die coater 70 must use the electrode active material slurries discharged simultaneously from different outlets 74, 75, it is very difficult to form each electrode active material layer with a desired thickness.

In general, the thickness of each electrode active material layer is affected by a discharge amount of the electrode active material slurry through the outlets 74, 75, and the discharge amount of the electrode active material slurry seriously affected by the gap between the die blocks 71, 72, 73. Thus, in order to obtain a desired thickness, it is necessary to adjust the gap by disassembling and reassembling each die block 71, 72, 73 while performing several coating processes experimentally, and then to check the discharge amount again.

However, in the conventional slot die coater 70, since three die blocks 71, 72, 73 are coupled to each other in order to form two outlets 74, 75, it may be required to separate all die blocks 71, 72, 73 in order to adjust the gap of any one of the outlets 74, 75. Also, since the separation of only one die block may affect the positions of the other die blocks, it is difficult to adjust the two outlets 74, 75 individually.

Moreover, if it is repeated to separate and reassemble the die block and a test coating is performed several times, the process time may be delayed, and the electrode active material slurry serving as a material is consumed more, which may seriously deteriorate the efficiency of the overall process. Moreover, the repeated disassembling and assembling may adversely affect the life of the slot die coater.

Thus, there is an urgent need to develop a slot die coater having an improved structure that may solve the above problems.

DISCLOSURE

Technical Problem

The present disclosure is designed to solve the problems of the related art, and therefore the present disclosure is directed to providing a slot die coater having an improved process efficiency, which may easily adjust a difference in electrode active material slurry discharging times of a lower outlet and an upper outlet just by a relative movement of a pair of slot dies located at upper and lower portions without dissembling and reassembling all die blocks of the slot die coater.

However, the technical problem to be solved by the present disclosure is not limited to the above, and other objects not mentioned herein will be understood from the following description by those skilled in the art.

Technical Solution

In one aspect of the present disclosure, there is provided a slot die coater for coating an electrode active material slurry on an electrode current collector, comprising: a lower die having a lower outlet; and an upper die disposed above the lower die and having an upper outlet, wherein an upper surface of the lower die and a lower surface of the upper die are at least partially in contact with each other and capable of sliding relative to one another such that the upper die and the lower die are capable of sliding relative to each other along a horizontal direction.

According to an embodiment, the upper outlet may be located at the rear of the lower outlet by a predetermined distance along the horizontal direction.

According to another embodiment, discharge directions of the lower outlet and the upper outlet may have an angle of 30 degrees to 60 degrees relative to each other.

Preferably, the lower die may include a first die block, a second die block located above the first die block, and a first spacer interposed between the first die block and the second die block so that the lower outlet is formed between the first die block and the second die block.

Preferably, the upper die may include a third die block, a fourth die block located above the third die block, and a second spacer interposed between the third die block and the fourth die block so that the upper outlet is formed between the third die block and the fourth die block.

According to another embodiment, the first die block may have a first slurry accommodation portion for accommodating a first electrode active material slurry, and the third die block may have a second slurry accommodation portion for accommodating a second electrode active material slurry.

Preferably, the first spacer may have a first open portion formed at one side thereof, the second spacer may have a second open portion formed at one side thereof, the first open portion may fluidly communicate with the first slurry accommodation portion, and the second open portion may fluidly communicate with the second slurry accommodation portion.

According to another embodiment, the second die block may have a first planar portion oriented along the horizontal direction and a first inclined portion extending from the first planar portion at a predetermined angle relative to the horizontal direction, and the third die block may have a second planar portion oriented along the horizontal direction and a second inclined portion extending from the second planar portion at a predetermined angle relative to the horizontal direction.

Preferably, the first planar portion and the second planar portion may be parallel to each other and make surface contact with each other, and the first inclined portion and the second inclined portion may be parallel to each other and make a surface contact with each other, when the upper outlet and the lower outlet are aligned along horizontal vertical direction. In another embodiment, where the upper outlet is located at the rear of the lower outlet by a predetermined distance along the horizontal direction, the first inclined portion and the second inclined portion may be separated from each other.

Preferably, a predetermined step may be formed on a portion of the surface of the first planar portion when an end of the first planar portion closer to the first open portion and an end of the second planar portion toward the second open portion are separated by a predetermined distance along the horizontal direction.

Advantageous Effects

According to an embodiment of the present disclosure, the slot die coater may have an improved process efficiency since it is easy to adjust a difference in electrode active material slurry discharging times of a lower outlet and an upper outlet just by a relative movement of a pair of slot dies located at upper and lower portions without dissembling and reassembling all die blocks of the slot die coater.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The configuration of a slot die coater 100 according to an embodiment of the present disclosure will be described with reference to FIGS. 3 and 4.

Figure 1:
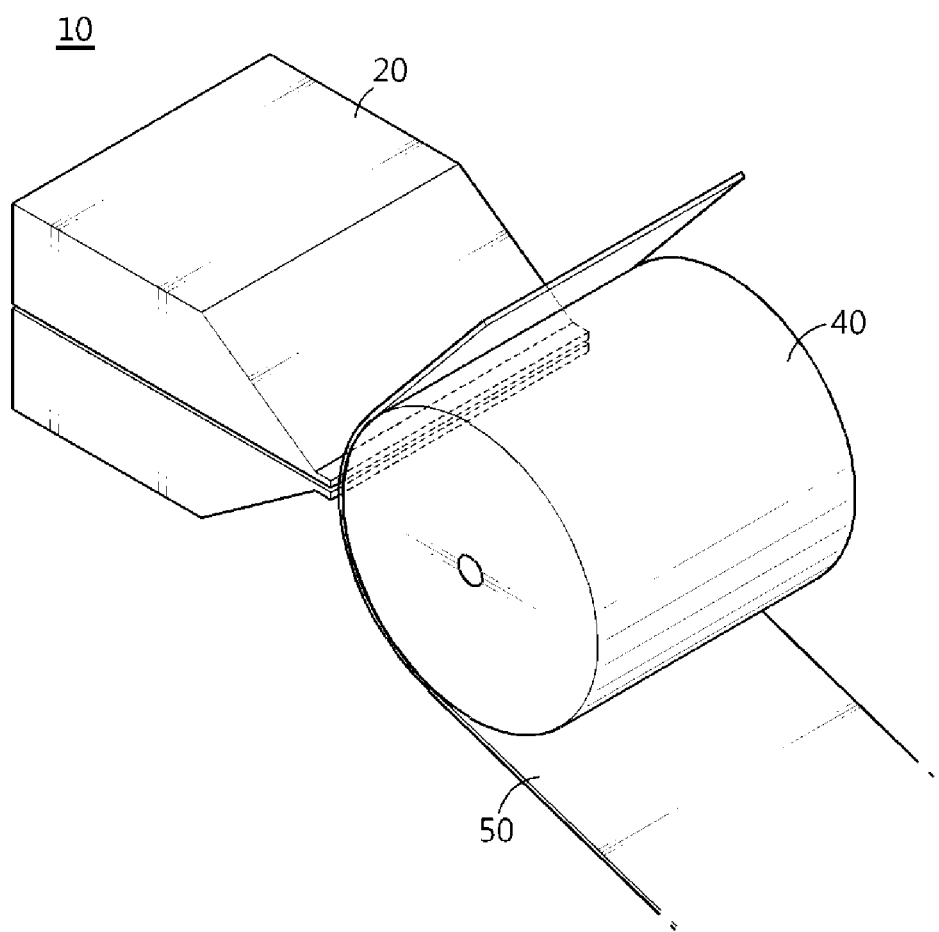
FIG. 1 is a schematic diagram showing an example using a conventional slot die coater.
Figure 2:
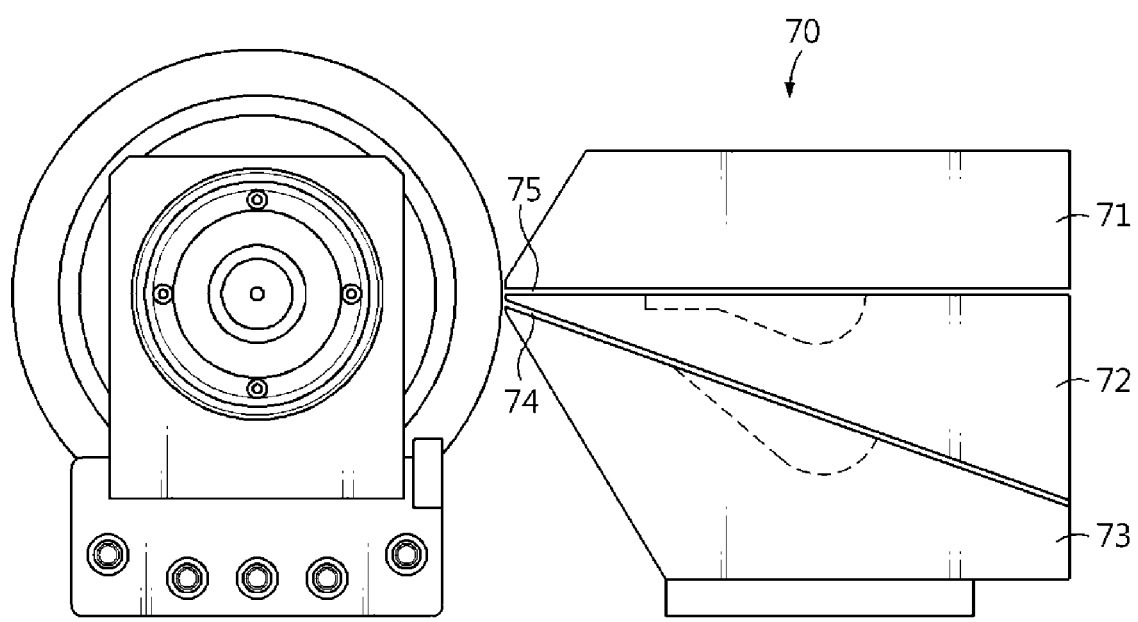
FIG. 2 is a cross-sectioned view showing a configuration of the conventional slot die coater used in a multi-layered active material coating process.
Figure 3:
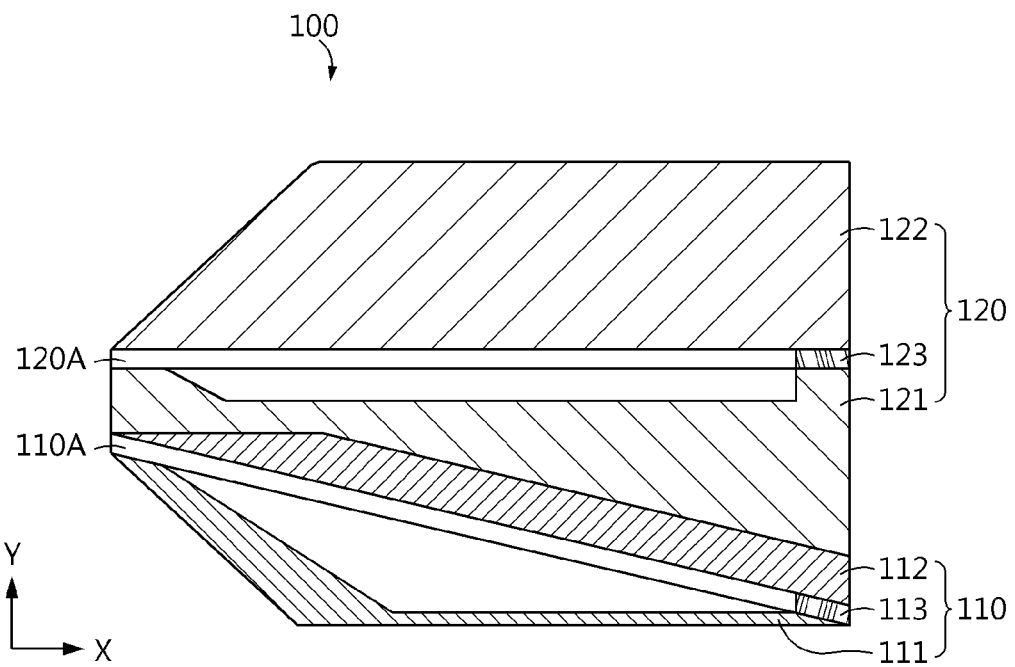
FIG. 3 is a vertical sectioned view showing a slot die coater according to an embodiment of the present disclosure.
Figure 4:
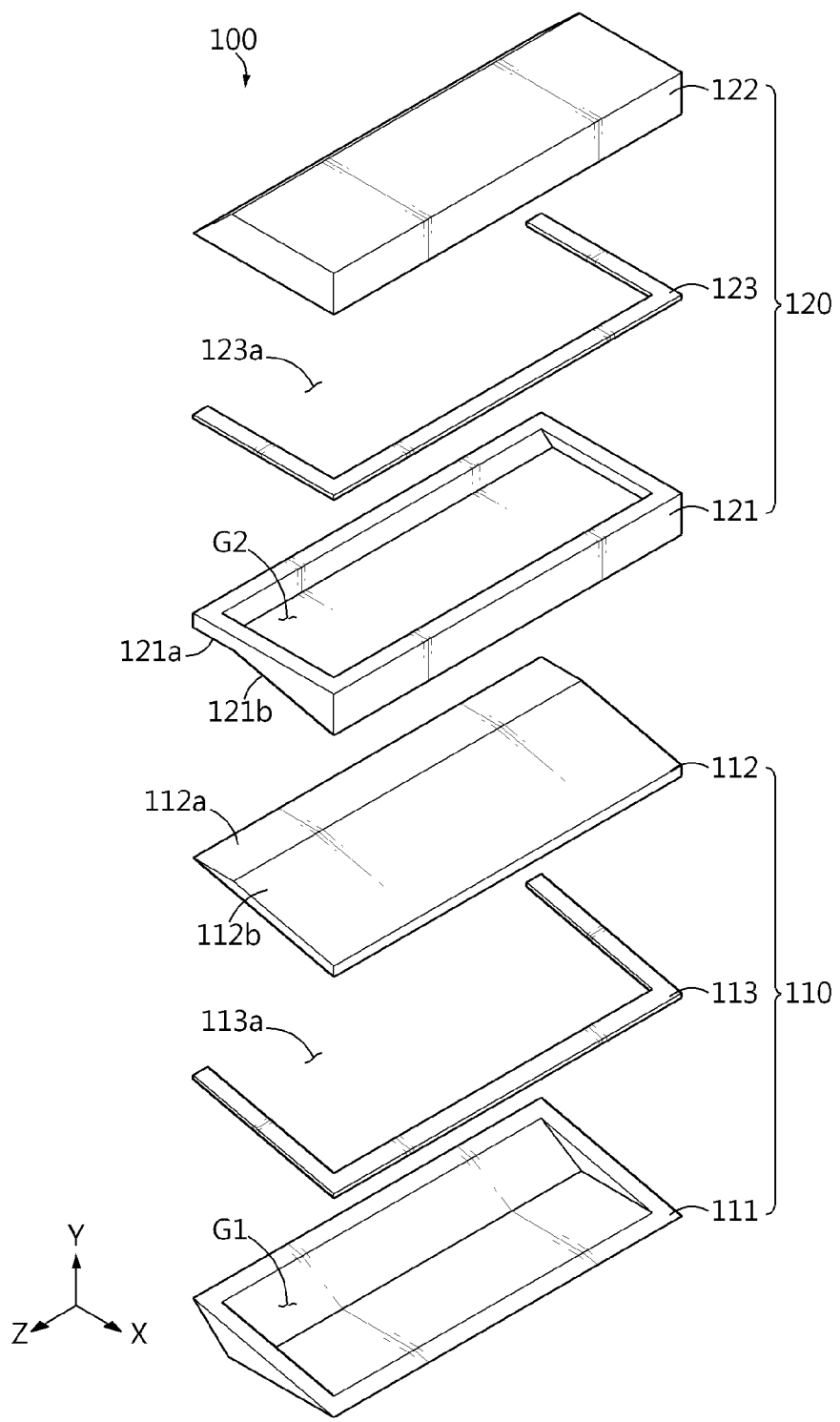
FIG. 4 is an exploded perspective view showing the slot die coater according to an embodiment of the present disclosure.

FIG. 3 is a vertical sectioned view showing a slot die coater according to an embodiment of the present disclosure, and FIG. 4 is an exploded perspective view showing the slot die coater according to an embodiment of the present disclosure.

Referring to FIGS. 3 and 4, the slot die coater 100 according to an embodiment of the present disclosure includes a lower die 110 having a lower outlet 110A and an upper die 120 having an upper outlet 120A.

The lower die 110 includes a first die block 111, a second die block 112, and a first spacer 113.

The first die block 111 is a block located at a lowermost side among the blocks of the slot die coater 100 according to an embodiment of the present disclosure. A surface of the first die block 111 facing the second die block 112 is inclined to have an angle of about 30 degrees to 60 degrees with respect to the ground.

Also, the first die block 111 has a first slurry accommodation portion G1 formed in a groove shape with a predetermined depth at a surface thereof facing the second die block 112. Though not shown in the figures, the first slurry accommodation portion G1 is connected to an active material slurry supply chamber installed at the outside to continuously receive a first active material slurry. Though not shown in the figures, the first slurry accommodation portion G1 may have a lower slurry supply port communicating with the slurry supply chamber.

If the first active material slurry is supplied from the active material slurry supply chamber to fully fill the first slurry accommodation portion G1 with the first active material slurry, the first active material slurry is discharged to the outside through the lower outlet 110A formed by sequentially coupling the first die block 111, the first spacer 113 and the second die block 112.

The second die block 112 is disposed above the first die block 111 and is coupled to the first die block 111 through the first spacer 113. Like the first die block 111, a surface of the second die block 112 facing the first die block 111 is inclined have an angle of about 30 degrees to 60 degrees with respect to the ground. That is, the facing surfaces of the first die block 111 and the second die block 112 are inclined to form an angle of about 30 degrees to 60 degrees relative to the ground.

In addition, the upper surface of the second die block 112 facing the upper die 120 is divided into two regions. That is, the upper surface of the second die block 112 includes a first planar portion 112a located relatively close to the lower outlet 110A and a first inclined portion 112b extending from the first planar portion 112a.

The first planar portion 112a extends in a direction parallel to the ground (an X-Z plane), and the first inclined portion 112b is inclined downward while forming an angle of about 30 degrees to 60 degrees with respect to the first planar portion 112a.

As described above, the upper surface of the second die block 112 may have a planar surface parallel to the ground and an inclined surface inclined relative to the ground, and may be matched with the upper die 120 having a lower surface shaped corresponding thereto.

Meanwhile, the first die block 111 and the second die block 112 may be made of a metal material. The first die block 111 and the second die block 112 may be coupled to each other by bolting or the like.

The first spacer 113 is interposed between the first die block 111 and the second die block 112 to form a gap between the first die block 111 and the second die block 112, thereby forming a space through which the first active material slurry supplied from the first slurry accommodation portion G1 may be discharged.

The first spacer 113 has a first open portion 113a formed at one side thereof, and thus the first spacer 113 is interposed only between rim regions of the facing surfaces of the first die block 111 and the second die block 112 except for one side thereof. In addition, the first die block 111 and the second die block 112 are spaced apart from each other in a region where the first open portion 113a is formed, thereby forming a space communicating with the first slurry accommodation portion G1, namely the lower outlet 110A.

The first spacer 113 functions as a gasket to prevent the first active material slurry from leaking through the gap between the first die block 111 and the second die block 112, except in the region where the lower outlet 110A is formed. Thus, the first spacer 113 is preferably made of a material with elasticity capable of securing a sealing property.

The upper die 120 includes a third die block 121, a fourth die block 122, and a second spacer 123.

The third die block 121 is a block located above the lower die 110 described above, and has a shape corresponding thereto so that the lower surface of the third die block 121 may be matched with the upper surface of the second die block 112.

That is, the lower surface of the third die block 121 facing the lower die 110 is divided into two regions. That is, the lower surface of the third die block 121 includes a second planar portion 121a located relatively close to the upper outlet 110A and a second inclined portion 121b extending from the second planar portion 121a.

The second planar portion 121a extends in a direction parallel to the ground (the X-Z plane), and the second inclined portion 121b is inclined downwards while forming an angle of about 30 degrees to 60 degrees with respect to the second planar portion 121a.

As described above, the lower surface of the third die block 121 has a planar surface parallel to the ground and an inclined surface inclined with respect to the ground, and may be matched with the upper surface of the lower die 110, namely the upper surface of the second die block 112, having a shape corresponding thereto.

In addition, the third die block 121 has a second slurry accommodation portion G2 formed in a groove shape with a predetermined depth at a surface thereof facing the fourth die block 122. Though not shown in the figures, the second slurry accommodation portion G2 is connected to an active material slurry supply chamber installed at the outside to continuously receive a second active material slurry. Though not shown in the figures, the second slurry accommodation portion G2 may have an upper slurry supply port communicating with the slurry supply chamber.

If the second active material slurry is supplied from the active material slurry supply chamber to fully fill the second slurry accommodation portion G2 with the second active material slurry, the second active material slurry is discharged to the outside through the upper outlet 120A formed by coupling the third die block 121 and the fourth die block 122.

The fourth die block 122 is disposed above the third die block 121 and coupled to the third die block 121, thereby forming the upper outlet 120A communicating with the second slurry accommodation portion G2.

Meanwhile, the third die block 121 and the fourth die block 122 may be made of a metal material, and the third die block 121 and the fourth die block 122 may be coupled to each other by bolting or the like.

The second spacer 123 is interposed between the third die block 121 and the fourth die block 122 to form a gap between the third die block 121 and the fourth die block 122, thereby forming a space through which the second active material slurry supplied from the second slurry accommodation portion G1 may be discharged.

The second spacer 123 has a second open portion 123a formed at one side thereof, and thus the second spacer 123 is interposed only between rim regions of the facing surfaces of the third die block 121 and the fourth die block 122 except for one side. In addition, the third die block 121 and the fourth die block 122 are spaced apart from each other in a region where the second open portion 123a is formed, thereby forming a space communicating with the second slurry accommodation portion G2, namely the upper outlet 120A.

The second spacer 123 functions as a gasket to prevent the second active material slurry from leaking through the gap between the third die block 121 and the fourth die block 122 except for the region where the upper outlet 120A is formed, and thus the second spacer 123 is preferably made of a material with elasticity to secure a sealing property.

Meanwhile, in the present disclosure, the first active material slurry and the second active material slurry may have the same constituents or different constituents. Whether or not the first active material slurry and the second active material slurry are identical or not is determined depending on whether it is intended to form different layers with the same active material having the same constituents or to form different layers with different active materials having different constituents, when forming two active material layer on an electrode current collector.

Next, the relative movement between the lower die and the upper die will be described with reference to FIG. 5.

Figure 5:
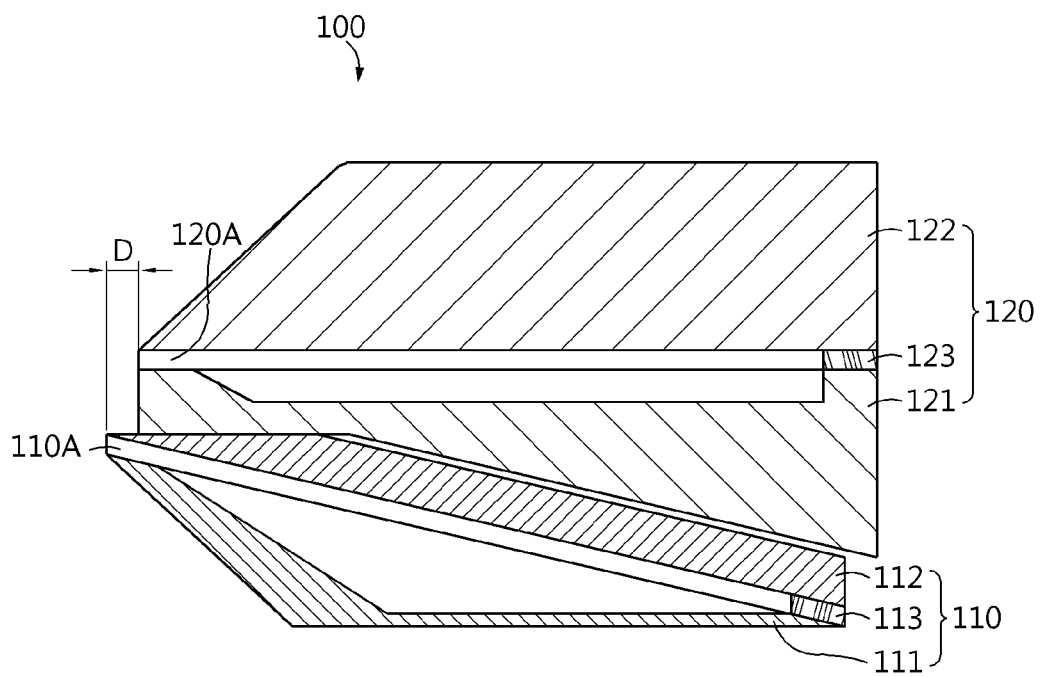
FIG. 5 is a diagram showing a case where a difference of locations is generated along a horizontal direction between a pair of outlets due to a relative movement of a lower die and an upper die, in the slot die coater according to an embodiment of the present disclosure.

FIG. 5 is a diagram showing a case where a difference of locations is generated along a horizontal direction between a pair of outlets due to a relative movement of the lower die 110 and the upper die 120, in the slot die coater 100 according to an embodiment of the present disclosure.

Referring to FIG. 5 along with FIGS. 3 and 4, the slot die coater 100 according to an embodiment of the present disclosure has two outlets 110A, 120A to form two active material layers on the electrode current collector. The two outlets 110A, 120A may be disposed at the front and rear to be spaced apart from each other along the horizontal direction for smooth coating of the electrode active material slurry.

That is, as shown in FIG. 5, the lower die 110 and the upper die 120 may be moved relative to each other by using a separate device for adjusting the form of the slot die coater 100 or by a manual work of a worker.

For example, in a state where the lower die 110 is left stationary not to move, the upper die 120 may be moved along the horizontal direction by a certain distance D to the rear, which is opposite to the discharge direction of the active material slurry, to form a step between the lower outlet 110A and the upper outlet 120A.

The width D of the step formed as above may be determined within a range of about several micrometers to several millimeters, and the width may be determined according to the thickness of the electrode active material layer formed on the electrode current collector.

That is, as the thickness of the electrode active material layer to be formed on an electrode current collector becomes thicker, the width D of the step becomes larger. For this reason, another electrode active material layer may be smoothly performed on the electrode active material layer formed by the first active material slurry discharged through the lower outlet 110A.

In addition, since the lower outlet 110A and the upper outlet 120A are disposed at locations spaced from each other along the horizontal direction, the electrode active material slurry discharged from the upper outlet 120A is blocked by a surface forming the step and thus does not flow into the lower outlet 110A. Thus, the multi-layered active material coating process may be performed more smoothly.

Meanwhile, referring to FIGS. 3 to 5, the upper surface of the lower die 110 and the lower surface of the upper die 120 respectively have planar portions 112a, 121a parallel to the ground and inclined portions 112b, 121b extending from the planar portions 112a, 121a to be inclined with a predetermined angle therefrom, and are matched with each other.

Accordingly, when the slot die coater 100 according to an embodiment of the present disclosure changes its form from a state where the upper outlet 120A is located at the rear of the lower outlet 110A as shown in FIG. 5 to a state where the upper outlet 120A and the lower outlet 110A are located side by side as shown in FIG. 3, it is possible to prevent the upper outlet 120A from moving further forward than the lower outlet 110A.

That is, the first inclined portion 112b and the second inclined portion 121b may serve as stoppers to each other to prevent the upper outlet 120A from moving further forward than the lower outlet 110A in a state where the lower die 110 and the upper die 120 are matched.

Figure 8:
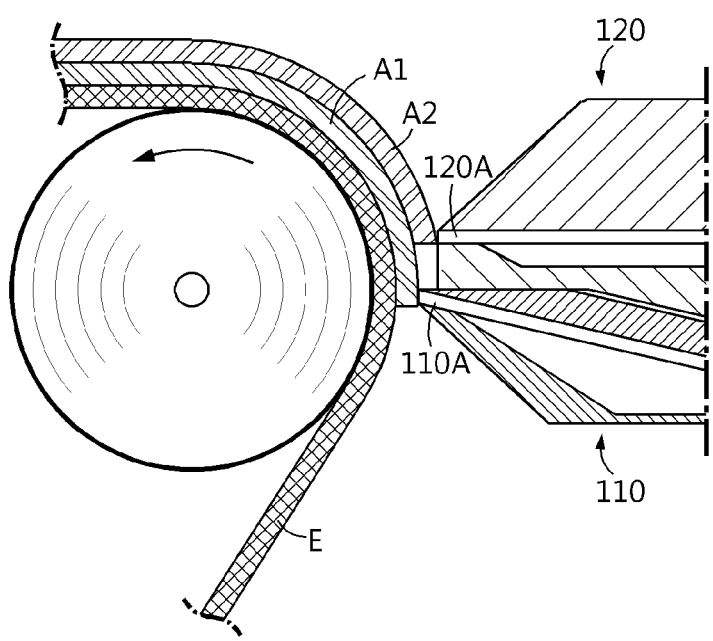
FIG. 8 is a diagram showing that an active material layer is formed with two layers by the slot die coater according to the present disclosure.

As described above, as shown in FIG. 8, the slot die coater 100 according to an embodiment of the present disclosure allows a first active material slurry A1 discharged from the lower outlet 110A formed at the lower die 110 and a second active material slurry A2 discharged from the upper outlet 120A formed at the upper die 120 to be coated to form two layers sequentially on an electrode current collector E.

Also, the slot die coater 100 may be configured so that the upper outlet 120A is located further rearward than the lower outlet 110A due to a relative sliding movement of the lower die 110 and the upper die 120. The slot die coater 100 may adjust the width of the step formed between the outlets 120A, 120B in consideration of the coating thickness of the second active material slurry A2.

Next, a slot die coater 200 according to another embodiment of the present disclosure will be described with reference to FIGS. 6 and 7.

Figure 6:
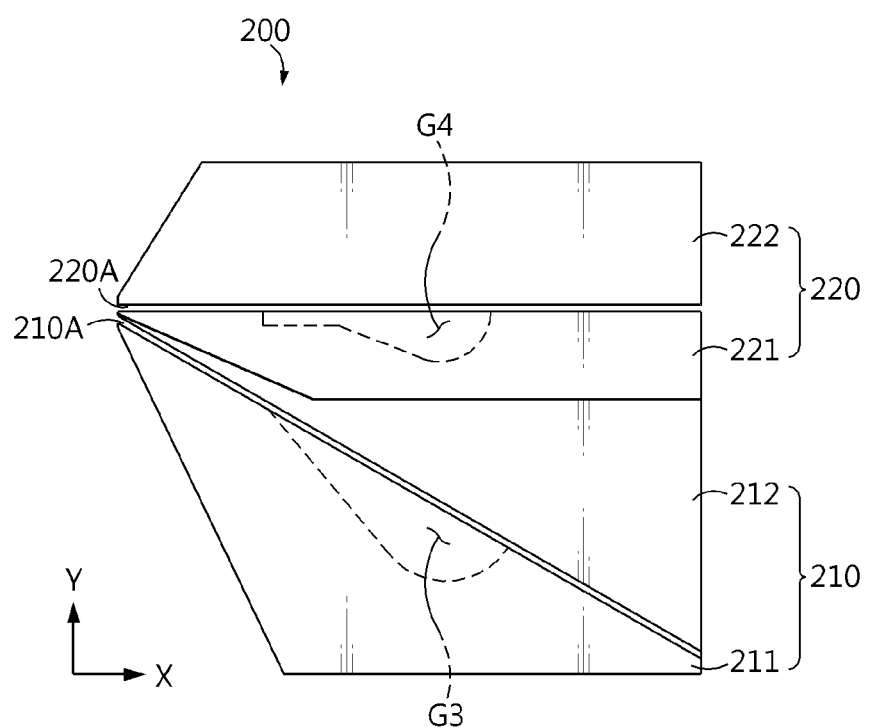
FIG. 6 is a vertical sectioned view showing a slot die coater according to another embodiment of the present disclosure.
Figure 7:
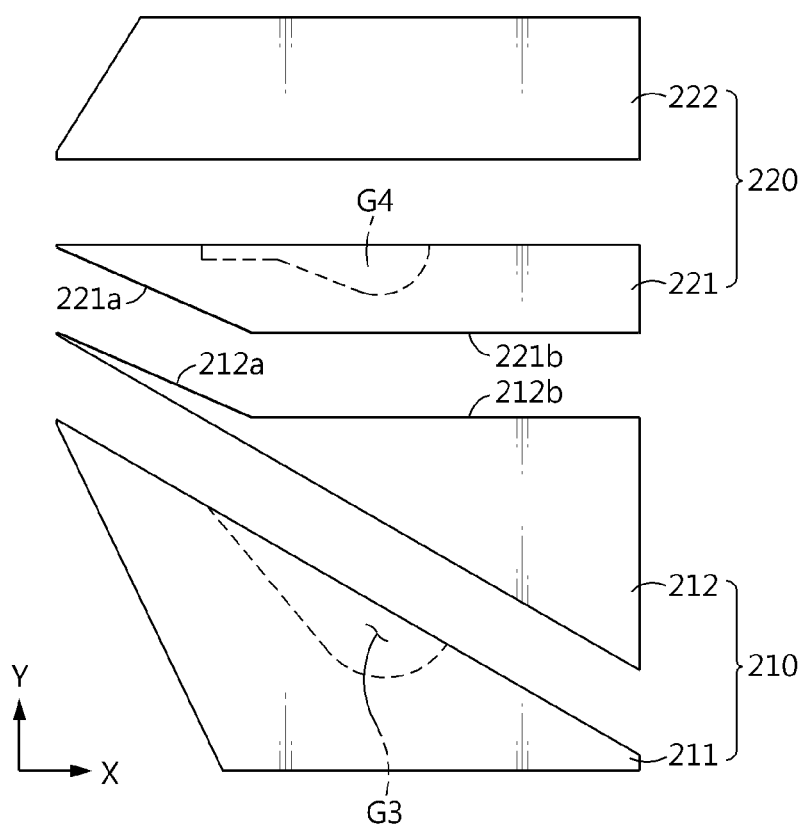
FIG. 7 is a cross-sectioned view showing that the die blocks of the slot die coater depicted in FIG. 6 are dissembled from each other.

FIG. 6 is a vertical sectioned view showing a slot die coater 200 according to another embodiment of the present disclosure, and FIG. 7 is a cross-sectioned view showing that the die blocks of the slot die coater 200 depicted in FIG. 6 are dissembled from each other.

Referring to FIGS. 6 and 7, the slot die coater 200 according to another embodiment of the present disclosure includes a lower die 210 having a lower outlet 210A and an upper die 220 having an upper outlet 220A.

The lower die 210 includes a first die block 211, a second die block 212, and a first spacer (not shown). The first die block 211 has a first slurry accommodation portion G3.

The upper die 220 includes a third die block 221, a fourth die block 222, and a second spacer (not shown). The third die block 221 has a second slurry accommodation portion G4.

The components of the slot die coater 200 according to another embodiment of the present invention are substantially the same as the components of the slot die coater 100 according to the former embodiment of the present disclosure, except that partial shapes of the second die block 212 and the third die block 221 are different. Thus, when explaining the slot die coater 200 according to another embodiment of the present disclosure, components identical to those of the former embodiment will not be described in detail, and only components different therefrom will be described in detail.

The upper surface of the second die block 212 facing the upper die 220 is divided into two regions. That is, the upper surface of the second die block 212 includes a first inclined portion 212a located relatively close to the lower outlet 210A and a first planar portion 212b extending from the first inclined portion 212a.

The first planar portion 212b extends in a direction parallel to the ground (the X-Z plane), and the first inclined portion 212a is inclined upward while forming an angle of about 30 degrees to 60 degrees with respect to the first planar portion 212b.

As described above, the upper surface of the second die block 212 may have a planar surface parallel to the ground and an inclined surface inclined relative to the ground, and may be matched with the upper die 220 having a lower surface shaped corresponding thereto.

The third die block 221 is a block located above the lower die 210 described above, and has a shape corresponding thereto so that the lower surface of the third die block 221 may be matched with the upper surface of the second die block 212.

That is, the lower surface of the third die block 221 facing the lower die 210 is divided into two regions. That is, the lower surface of the third die block 221 includes a second inclined portion 221a located relatively close to the upper outlet 220A and a second planar portion 221b extending from the second inclined portion 221a.

The second planar portion 221b extends in a direction parallel to the ground (the X-Z plane), and the second inclined portion 221a is inclined upward while forming an angle of about 30 degrees to 60 degrees with respect to the second planar portion 221b.

As described above, the lower surface of the third die block 221 has a planar surface parallel to the ground and an inclined surface inclined with respect to the ground, and may be matched with the upper surface of the lower die 210, namely the upper surface of the second die block 212, having a shape corresponding thereto.

The first inclined portion 212a and the second inclined portion 221a may serve as stoppers to each other to prevent the upper outlet 220A from moving further forward than the lower outlet 210A in a state where the lower die 210 and the upper die 220 are matched.

In addition, as described above, in the slot die coater 100, 200 according to the present disclosure, the lower die and the upper die respectively configured using two die blocks have outlets independently from each other, and even though the lower die and the upper die move along the horizontal direction relative to each other, the shape of the lower outlet and the upper outlet is not affected thereby.

Thus, when it is required to change relative positions between the lower outlet and the upper outlet according to the thickness of the electrode active material layer to be coated on the electrode current collector, the slot die coater according to the present disclosure may simply adjust the relative positions by sliding the lower die and/or the upper die, and it is not necessary to disassemble and reassemble the die blocks, different from a conventional slot die coater, thereby greatly improving the process efficiency.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A slot die coater for coating an electrode active material slurry on an electrode current collector, comprising:
   a lower die having a lower outlet and a lower slurry supply port; and
   an upper die disposed above the lower die and having an upper outlet and an upper slurry supply port,
   wherein the lower and upper slurry supply ports are for receiving a slurry into the lower and upper die, respectively,
   wherein an upper surface of the lower die and a lower surface of the upper die are at least partially in contact with each other and capable of sliding relative to one another such that the upper die and the lower die are capable of sliding relative to each other along a horizontal direction,
   wherein the upper surface of the lower die has a planar surface oriented along the horizontal direction and an inclined surface extending from the planar surface and inclined relative to the horizontal direction, and
   wherein the lower surface of the upper die has a shape corresponding to that of the upper surface of the lower die.

2. The slot die coater according to claim 1,
   wherein the upper outlet is located at the rear of the lower outlet by a predetermined distance along the horizontal direction.

3. The slot die coater according to claim 1,
   wherein discharge directions of the lower outlet and the upper outlet have an angle of 30 degrees to 60 degrees relative to each other.

4. The slot die coater according to claim 1,
   wherein the lower die includes a first die block, a second die block, and a first spacer interposed between the first die block and the second die block so that the lower outlet is formed between the first die block and the second die block, and
   wherein the upper die includes a third die block, a fourth die block, and a second spacer interposed between the third die block and the fourth die block so that the upper outlet is formed between the third die block and the fourth die block.

5. The slot die coater according to claim 4,
   wherein the first die block has a first slurry accommodation portion for accommodating a first electrode active material slurry, wherein the first slurry accommodation portion includes the lower slurry supply port, and
   wherein the third die block has a second slurry accommodation portion for accommodating a second electrode active material slurry, wherein the second slurry accommodation portion includes the upper slurry supply port.

6. The slot die coater according to claim 5,
   wherein the first spacer has a first open portion, and the second spacer has a second open portion formed, and
   wherein the first open portion fluidly communicates with the first slurry accommodation portion, and the second open portion fluidly communicates with the second slurry accommodation portion.

7. The slot die coater according to claim 4,
   wherein the second die block has a first planar portion oriented along the horizontal direction, and a first inclined portion extending from the first planar portion at a predetermined angle relative to the horizontal direction, and
   wherein the third die block has a second planar portion oriented along the horizontal direction and a second inclined portion extending from the second planar portion at a predetermined angle relative to the horizontal direction.

8. The slot die coater according to claim 7,
   wherein the first planar portion and the second planar portion are parallel to each other and make surface contact with each other, and the first inclined portion and the second inclined portion are parallel to each other and make surface contact with each other, when the upper outlet and the lower outlet are aligned along vertical direction.

9. The slot die coater according to claim 7, wherein a predetermined step is formed on a portion of the surface of the first planar portion when an end of the first planar portion closer to the first outlet and an end of the second planar portion closer to the second outlet are separated by a predetermined distance along the horizontal direction.

10. The slot die coater according to claim 7, wherein the first planar portion and the second planar portion are parallel to each other and make surface contact with each other, and the first inclined portion and the second inclined portion are parallel to each other and separated from each other, when the upper outlet is located at the rear of the lower outlet by a predetermined distance along the horizontal direction.

* * * * *